United States Patent

[11] 3,584,944

| [72] | Inventor | Gerald H. Cook |
| | | Lynnfield, Mass. |
| [21] | Appl. No. | 761,756 |
| [22] | Filed | Sept. 23, 1968 |
| [45] | Patented | June 15, 1971 |
| [73] | Assignee | Polaroid Corporation |
| | | Cambridge, Mass. |

[54] MOTION PICTURE FILM CASSETTE
8 Claims, 6 Drawing Figs.

[52] U.S. Cl. .................................................. 352/130,
242/199, 352/78
[51] Int. Cl. .................................................. G03c 5/28
[50] Field of Search............................................ 352/72-
—78, 130; 95/90.5; 242/197, 199, 200

[56] References Cited
UNITED STATES PATENTS

| 2,275,497 | 3/1942 | Berndt................ | 242/200 |
| 2,560,564 | 7/1951 | Foster et al............ | 352/78 X |
| 2,931,857 | 4/1960 | Hammond, Jr. et al....... | 352/130 X |
| 3,041,952 | 7/1962 | Schreck................ | 95/14 |
| 3,053,140 | 9/1962 | Brogan et al............ | 352/72 |
| 3,281,200 | 10/1966 | Weninger.............. | 352/78 |
| 3,367,046 | 2/1968 | Neuberger............. | 352/130 X |
| 3,383,998 | 5/1968 | Takats................ | 95/90.5 |
| 3,410,498 | 11/1968 | Winkler et al. ........... | 352/78 X |
| 3,475,089 | 10/1969 | Funck ................. | 352/78 X |
| 3,480,351 | 11/1969 | Blaschek.............. | 352/78 X |

FOREIGN PATENTS

| 3,798 | 12/1908 | Great Britain............... | 352/78 |

Primary Examiner—Louis R. Prince
Assistant Examiner—Joseph W. Roskos
Attorney—Brown and Mikulka ABSTRACT: A film cassette or magazine for use both in a moving-picture camera and projector. The cassette is employed in a plurality of operations, namely, in performing the photographic exposure, in rapidly processing an exposed length of motion-picture film especially adapted to the purpose, and, immediately following the processing step, in projecting the film sequence for viewing purposes.

PATENTED JUN 15 1971

INVENTOR.
Gerald H. Cook
BY Brown and Mikulka
ATTORNEYS

PATENTED JUN 15 1971        3,584,944

INVENTOR.
Gerald H. Cook
BY Brown and Mikulka
ATTORNEYS

MOTION PICTURE FILM CASSETTE

A camera adapted to use the aforesaid motion-picture film and cassette may, for example, appropriately, be of a type also capable of accepting a standard motion-picture film such, for example, as one having the physical characteristics of a so-called "Super 8" film, sold by Eastman Kodak Co., Rochester, New York, U.S.A. The camera may, therefore, be of a substantially conventional category embodying means cooperating with the cassette of the invention for mounting the same and for driving rotatable components thereof, while at the same time being optically suited to utilize the special film contained therein. On the other hand the camera may possess characteristics especially adapted to the type of motion-picture film carried by the cassette.

A viewing device adapted to employ the subject cassette is contemplated in the form of a compact cabinet-type unit incorporating a viewing screen comparable in area to that of a television receiver. Such a unit is primarily intended for home entertainment purposes but, alternatively, its use may be extended to scientific or other fields where an immediate showing is of advantage following the taking of a motion-picture. The viewing component may also be used for accommodating standard motion-picture film.

Although a certain degree of recognition has previously been given to the possibility of rapidly processing and viewing an exposed motion-picture film, no practical system is known to have evolved therefrom. At least no such system is believed to have as yet been made available in a form adapted to public usage. Included in the art relating to the subject may be listed U.S. Pat. No. 2,930,302, 2,971,445 and 3,237,541. In general, a complexity of apparatus appears to pervade the art which complexity is unsuited to cost, appearance and operational-simplicity limitations considered of importance herein.

The current trend in nonprofessional or so-called "home-movie" picture-taking is to employ a cassette holding a supply of motion-picture film which can easily and quickly be mounted in a camera and which, when thus mounted, provides, automatically, that the film is correctly threaded and ready for "shooting." After exposure of a complete length of film, the cassette, customarily, is removed from the camera and forwarded to a remote processing station, as by postal means, for accomplishing its processing. The processed film is then returned on a spool or in a second cassette ready for projection. The projector usually includes means for readily mounting and removing the spool or second cassette and for automatically threading the film.

The cassette of the present invention includes the operational advantages, above described with respect to rapid mounting of motion-picture film in a camera or projector, as well as its equally-rapid removal therefrom. However, it combines these advantages in a single unit adapted to mounting in both the camera and the projector for performing both the taking and viewing operations. And, because of its function with respect to film processing, the cassette eliminates the delay, usually measured in days, which is conventionally required to process a motion-picture film after its exposure. A system including the cassette of the present invention permits the viewing of a completely processed motion-picture film within a matter of minutes after taking it. It also makes possible the viewing of extensive film footage immediately upon returning from a protracted period of picture taking.

In view of the foregoing considerations, objects of the invention are to provide a cassette having supply and takeup spools adapted to use with both a motion-picture camera and projector having cooperating driving means for the spools; to provide cassette apparatus as defined having a rewing or reverse direction capability; to provide a cassette of the type stated in which leading and trailing ends of the motion-picture film always remain attached to the spools and the spools, when undergoing rotation, serve as the film-takeup means in a camera as well as film-takeup and reversal or rewind means in a projector, without the need of additional supply or takeup reels; to provide a cassette of the character set forth which is composed of two manually separable sections in one of which is mounted film-moving, exposure and projection means, the other being principally assigned to film processing purposes and, optionally being of a disposable type; to provide a cassette of the character described which is capable of utilizing black-and-white and color film materials adapted to rapid processing; to provide cassette apparatus which includes gear means for driving a takeup spool; to provide a cassette as stated including snubbing and guide means for controlling the direction and enabling an even movement of the film; to provide a two-section cassette of the type set forth in which a snubbing element is mounted in one of the sections and means controlling its operation is mounted in the other removable section; to provide a cassette as characterized wherein means providing a chamber substantially open at two sides is located immediately adjacent to an exposure aperture of the cassette for introduction of supplemental components thereinto; to provide a cassette as outlined which is adapted to operation in conjunction with conventional intermittent and friction-clutch film-advancing means; to provide a cassette of the type stated having a generally rectangular and, more particularly, a substantially square housing and a diagonal inline mounting of supply and takeup spools therewithin to enable the provision of maximum film footage on the spools; and to provide a cassette of the character described which is adapted to rapid processing of the motion-picture film contained therein during its movement from one spool to the other.

Other objects of the invention will in part be obvious and will in part appear hereinafter.

The invention accordingly comprises the product and apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
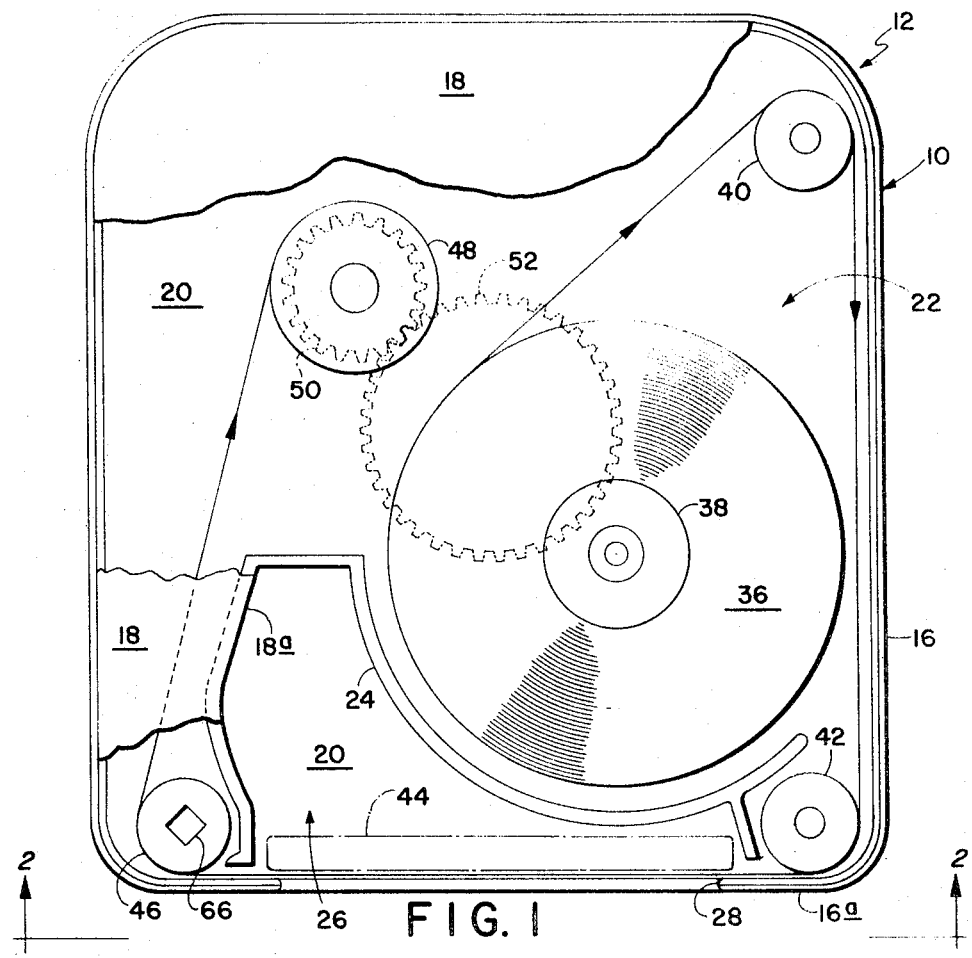
FIG. 1 is a diagrammatic side view of the film-containing section of the cassette, taken in a first direction 1-1 of FIG. 2.
Figure 2:
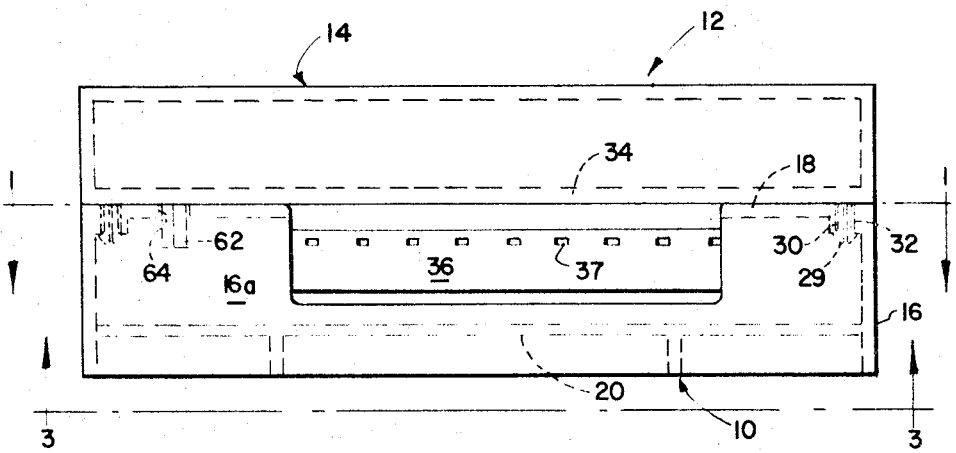
FIG. 2 is a diagrammatic end view of the complete cassette, taken in the direction 2-2 of FIG. 1.

Referring now to the drawings, in FIG. 1 a first or film-containing section 10 of the rectangular dual-section cassette 12 is shown from one side, namely, from that side which is held in contiguous relation with a second section 14 (FIG. 2). The external and internal walls of the cassette are formed of a suitable opaque plastic material as, for example, of a black polystyrene.

The cassette film-accommodating section 10 includes an end wall 16, a first light-shielding sidewall 18 mounted across one face thereof, exclusive of an excised or cutaway portion 18a, and a recessed web or sidewall 20, parallel to wall 18, for both mounting the film-moving components and providing an additional light-shield relative to the film which is located in a first chamber 22 formed by the area lying between the walls 18 and 20, the end wall 16 and an internal contoured wall or partition 24. The partition 24 interconnects the walls 18 and 20 transversely of the section 10 and is of a length such as to form a cavity or second partially-open chamber 26 extending inwardly of the aperture provided by the excised plate portion 18a. Partition 24 thus serves as a wall common to both chambers 22 and 26. An opening 28 constituting an exposure aperture is formed in the end wall portion 16a and leads into the chamber 26. The internal partition 24, in addition to forming the chamber 26 in conjunction with the wall 20 and end wall portion 16a, provides a light and dust shield or barrier with respect to film materials contained within the chamber 22.

The second section 14 of the cassette is intended to be used in a special capacity, e.g., as a container for a developing liquid or for other means associated with an ultrarapid processing operation following exposure of the film. Section 14 is held in firm but manually-releasable engagement with the section 10 by a plurality of compressible, e.g., slotted, studs 29 projecting from one of the sections and inserted in mating apertures of the other section. As shown, the studs 29 project from the section 14 and are positioned within the apertures 30 formed in block portions 32 of the section 10 but a reverse arrangement of the components is, of course, possible. It is to be noted that when the two cassette sections are fastened together, as shown in FIG. 2, the cutaway portion 18a forming an opening into chamber 26 is contiguous with, and hence covered by, a principal wall 34 of the section 14.

The cassette is supplied loaded with a photosensitive film 36 for use in a camera. As indicated in FIG. 2, the two sections 10 and 14 are held together in assembled relation at this initial stage, the combined thickness being adapted to acceptance by the camera for mounting therein. Assuming, for example, that the cassette, as represented in FIG. 1, is in readiness for loading in a camera and, accordingly, that the film 36 is as yet unexposed, a given length thereof, e.g. 50 feet, is provided on a supply spool 38 adapted to substantially free rotation, in a clockwise direction as shown, an inner or trailing end of the film being attached to the spool.

Figures 4, 6:
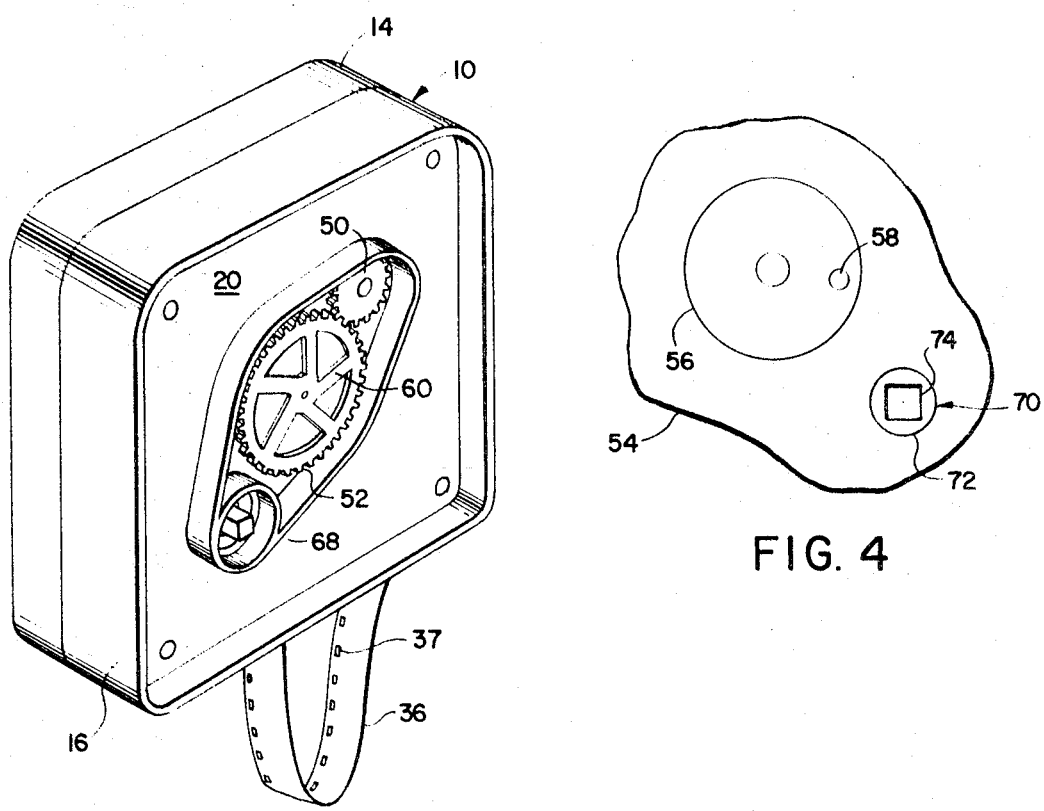
FIG. 4 is a diagrammatic fragmentary view of complementary actuating means for the driving mechanism of FIG. 3.
FIG. 6 is a diagrammatic perspective view of the cassette taken from the driving-mechanism side.
Figure 3:
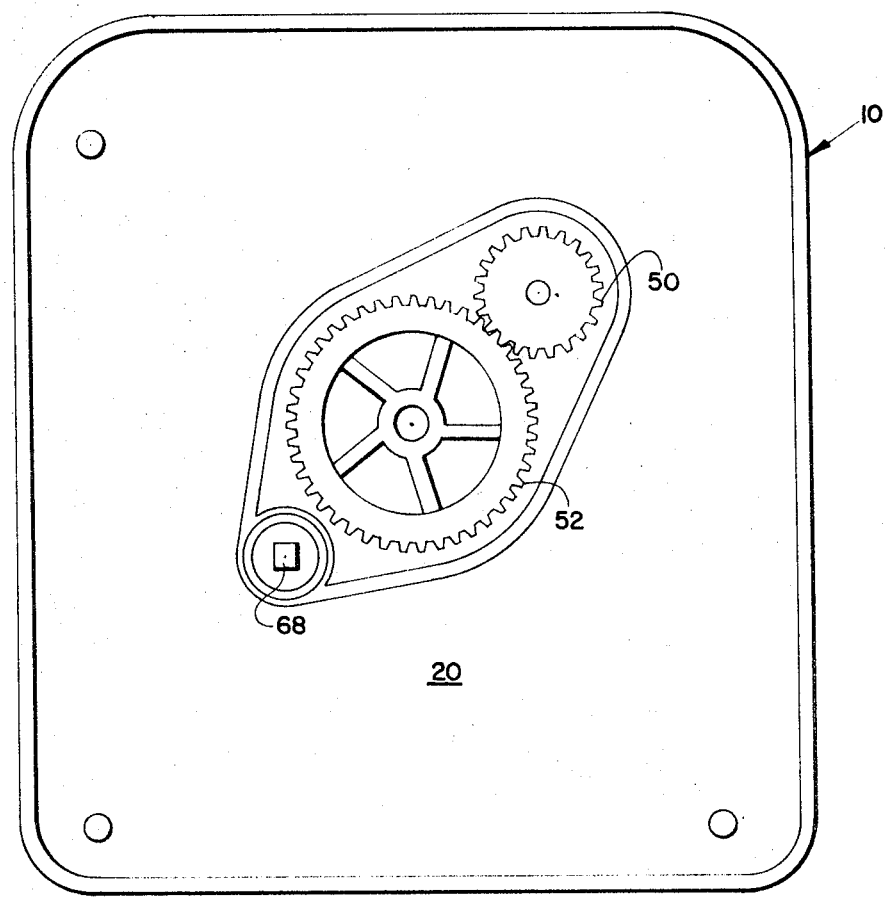
FIG. 3 is a diagrammatic side view of the film-containing section of the cassette, taken in a second direction 3-3 of FIG. 2 and showing the driving mechanism.

From supply spool 38, the film passes around the freely-rotatable guide rolls 40 and 42, across the exposure aperture 28 having a pressure plate 44 positioned thereacross to provide correct positioning of the film for exposure, around the fixedly-held snubbing roll 46, and is finally taken up on the takeup spool 48. The takeup spool includes an integral coaxial gear 50 located at the opposite side of wall 20. A drive gear 52 meshes with gear 50, driving the latter at a 2 to 1 ratio. The gear 52, in turn, is adapted to be rotated by driving means of a camera. The camera is represented in FIG. 4 by the fragmentary wall portion 54, the rotatable driving disc 56, and the integral pin 58 projecting therefrom (FIG. 4). The pin 58 is adapted to engage a radial surface of one of the spokes 60 of the gear 52 whenever the cassette is mounted in the camera to provide rotation of the takeup spool 48. The film is wound on the supply spool and taken up on the takeup spool with the film emulsion innermost, as necessitated by the film structure and its positioning for correct exposure. A film structure relating to that employed in the cassette of the present invention is shown in U.S. Pat. No. 3,087,815.

Assuming the cassette sections 10 and 14 to be in assembled relation, as in FIG. 2, a rectangular pin 62, integral with the cassette section 14, and projecting from the wall 34 thereof, extends through an aperture 64 formed in wall 18 of section 10 into the interior of the latter section, and enters a rectangular recess 66 (FIG. 1) formed in the snubbing roll 46. The snubbing roll is composed, for example, of a molded rubber having a concavity 47 adapted to accept a mounting spindle. The surface of the snubbing element 46 is slightly concave as shown in FIG. 5, "a," to relieve contact thereof with the film emulsion.

When the pin 62 is positioned in recess 66, the snubbing roll 46 is held against rotation and performs a film-controlling or snubbing function in cooperation with intermittent means of the camera (not shown) and takeup driving means of the latter in the form of a conventional friction clutch (not shown) which actuates the disc 56 and pin 58.

Figure 5:
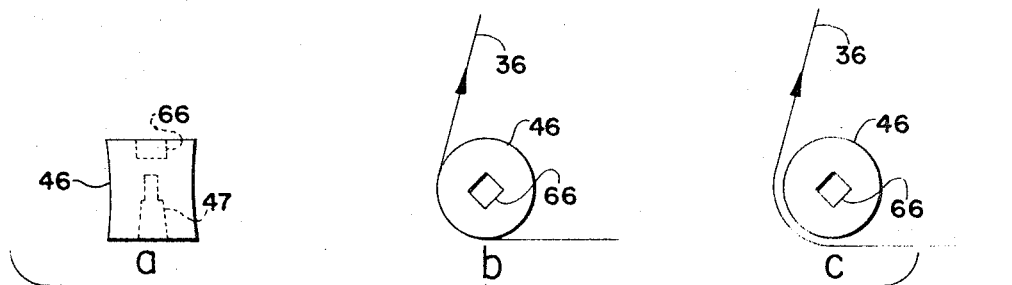
FIG. 5 is a diagrammatic view illustrating operation of the snubbing component of FIG. 1.

Action of the snubbing element 46 is shown in FIG. 5, "b" and "c." In "b" the film is held stationary by the snubbing element. In "c" it is to be assumed that a claw component of the camera intermittent movement, engaging the sprocket holes, has pushed the film away from the snubbing element permitting its being taken up by the spool 48.

A preferred embodiment of the invention, wherein the cassette spools, in conjunction with the intermittent movement of a camera or projector, are utilized to provide all film movements, implies that a film leader is permanently attached to the takeup spool 48 and that a trailing end of the film is permanently attached to the supply spool 38, the spools being formed of a plastic, a metal, or the like and being mounted for rotation in suitable bearing means of wall 20. Assuming the film to be fastened to the spools as by short pieces of tape or integral pins, it is necessary, of course, to insure a stoppage of film movement at conclusion of either a takeup or rewind operation. Inasmuch as rewinding of the film is not involved in a conventional camera, stopping the film advance can be accomplished by providing a film portion near the trailing end having the sprocket holes 37 excised therefrom. The intermittent claw, accordingly, will cease to engage the film and the slip-clutch of the camera, driving the takeup spool 48 through gears 50 and 52, will slip briefly until its actuating power is turned off.

Rewinding of the film, after its exposure and takeup on spool 48 and again assuming nonperformance thereof in a conventional camera, is to be taken as occurring in another medium as, for example, in a projector adapted to mount the cassette and to cooperate in its processing as well as in its projection. For this purpose, the cassette section 14 is manually removed from engagement with the section 10, thereby removing the pin 62 from its functional position in the recess 66 and permitting unimpeded rotation of the element 46. The latter now loses its snubbing function and becomes merely a freely-turning guide roll. The supply spool 38 includes an integral, projecting rectangular shaft 68 which is adapted to be engaged by rewind driving means 70 comprising the rotatable shaft 72 having a rectangular recess 74 formed therein.

Whereas the wall section 54, the disc 56 and the pin 58 (FIG. 4) have been described hereinbefore as elements of a camera, it is to be understood that they may, as well, be considered as representative of driving means for film advancement in a projector in cooperation with the rewind driving element 70 which, desirably, could have a high-speed rewind capability. Where considered in relation to film projection, the film 36 may, rationally, be considered as having been exposed and processed prior to passing across the aperture 28 which, in this instance, may be taken as constituting or related to projection gating means.

In rewinding the film, from spool 48 to spool 38 the friction-clutch of the camera mechanism, which had previously been employed to turn gear 52 and, accordingly, the spool 48 during film advancement and takeup, rotates without restriction in the opposite or rewind direction. The film then passes, in order, around the freely-rotatable rolls 46, 42 and 40 to the supply spool 38. The latter may also be assumed to be driven by a friction clutch of the projector mechanism whereby then when the end of the film which is fastened to spool 48 is reached, the spool 38 is held against further rotation and the power may then be switched off.

It will be understood that modifications of the driving linkages set forth herein between camera and cassette and projector and cassette are readily possible within the scope of the invention and include a reversal in position of the components described as well as the use of keying means and the like. The walls 18 and 20 are spaced apart by an amount very slightly exceeding the width of the film and readily permit slidable movement of the film edges thereagainst. Accordingly, the walls serve as guide means to provide correct film tracking, that is, proper positioning of the film on the several spools and guide rolls throughout the steps of film advance and rewind.

Wherein the pin 62 has been described as integral with the cassette section 14 and removed from its functional position with respect to the snubbing element 46 upon separation of section 14 from section 10 and possible ultimate disposal of section 14 after its use for a processing or other purpose, it is to be understood that a modification of the cassette structure to that of a single section of, for example, the combined thickness of the two sections shown could occur. This would permit the pin 62 to be in form of a slidable square-ended plunger enabling engagement or release with respect to the recess 66 of snubbing element 46.

The gears, guide rolls and spools may, appropriately, be composed of a thermoplastic acetal resin or a metal, as previously intimated. The chamber 26, being partially open upon removal of the cassette section 14, as permitted by the excised wall portion 18a and thus readily accessible, may be employed for the introduction of or releasable or permanent attachment of various elements associated with or contributing to the exposure, processing and projection of the film 36. The film, accordingly, may be treated within the chamber or a loop thereof may be pulled from the cassette, as shown in FIG. 6 for processing or other purposes, depending upon the processing or projection techniques employed.

With reference to the rectangular and essentially square dimensions of the cassette and its overall thickness, as illustrated, it is to be noted that the cassette conforms generally in shape to a magazine or cassette employed in a so-called "-Super 8" system. From a positional viewpoint, employment of the gear 52 provides a driving element adapted to engagement by driving means of cameras conventionally employed in the aforesaid system. It is to be understood, however, that while the cassette of the present invention is adapted to use in a "-Super 8" system, it is not to be considered as limited to use in conjunction with either a camera or a projector of such a system or to any specific film dimension identified therewith. In conjunction with the square contour of the cassette, the diagonal in-line arrangement of the supply and takeup spools will be noted as permitting a maximum use of the internal dimension of the cassette with respect to accommodation of a film material. Additionally, it will be recognized that for particular applications the film accommodating section 10 can be formed without the portion of wall 20 bounded by partition 24 to provide access into the chamber 26 from the opposite side of the film accommodating section as viewed in FIG. 1.

Since certain changes may be made in the above product and apparatus without departing from the scope of the invention herein involved, it is intended that all matter contained in the above description or shown in the accompanying drawings shall be interpreted as illustrative and not in a limiting sense.

What I claim is:

1. A multipurpose motion picture cassette facilitating the exposure of a strip of photographic material when mounted in a camera system of the type configured to receive film handling cassettes, of the same general configuration and dimensions having coaxially mounted supply and takeup spools disposed therein for rotation about an axis passing through such cassette in the vicinity of the point defined by the intersection of the two diagonal lines between opposite corners of such a cassette and normal to such lines, and including drive means adapted to effect the selective rotation of such takeup spool about its such axis, and to facilitate the subsequent processing and projection of the exposed strip of photographic material when said cassette is mounted in a projector unit, comprising:

a substantially rectangular housing having a centerline passing through said cassette in the vicinity of the point defined by the intersection of the two diagonal lines between opposite corners of said housing and normal to said lines, said housing being divided into first and second substantially rectangular sections releasably mounted together whereby they may be mounted in such camera system as a single unit and subsequently separated and mounted in such projector unit as two separate units, said first section being adapted to contain a quantity of processing fluid;

a supply spool mounted in said second section for rotation about a first axis parallel to and spaced from said centerline;

a takeup spool mounted in said second section for rotation about a second axis parallel to and spaced from both said centerline and said first axis;

first means for defining an opening in said second section adapted to facilitate both the exposure and projection of photographic material contained within said second section;

second means within said second section for guiding photographic material contained therein along a given path between said supply spool and said takeup spool and across said opening, said second means including a roller mounted for rotation in either direction on its axis;

a strip of unexposed photographic material having one end thereof connected to said supply spool and substantially entirely coiled therearound and extending therefrom along said path to said takeup spool to which the other end of said strip of photographic material is attached;

third means for selectively driving said takeup spool to effect the advance of said strip of photographic material from said supply spool to said takeup spool to facilitate exposure and projection operations, said third means including a member mounted for rotation about said centerline and connected to said takeup spool adapted to be operably engaged by such drive means of such camera;

fourth means for selectively driving said supply spool to effect the return of said strip of photographic material to said supply spool adapted to be operably engaged by drive means of such projector when said cassette is mounted therein, whereby said strip of photographic material may be processed with such fluid contained within said first section of said housing during its movement from one spool to the other after said strip of photographic material has been exposed and said cassette mounted in such projector; and fifth means for restraining such rotational movements of said roller on its said axis only when said sections are mounted together.

2. A multipurpose motion picture cassette facilitating the exposure of a strip of photographic material when mounted in a camera system of the type configured to receive film handling cassettes, of the same general configuration and dimensions having coaxially mounted supply and takeup spools disposed therein for rotation about an axis passing through such cassette in the vicinity of the point defined by the intersection of the two diagonal lines between opposite corners of such a cassette and normal to such lines, and including drive means adapted to effect the selective rotation of such takeup spool about its such axis, and to facilitate the subsequent processing and projection of the exposed strip of photographic material when said cassette is mounted in a projector unit, comprising:

a substantially rectangular housing having a centerline passing through said cassette in the vicinity of the point defined by the intersection of the two diagonal lines between opposite corners of said housing and normal to said lines, said housing being divided into first and second substantially rectangular sections, said first section being adapted to contain a quantity of processing fluid;

a supply spool mounted in said second section for rotation about a first axis parallel to and spaced from said centerline;

a takeup spool mounted in said second section for rotation about a second axis parallel to and spaced from both said centerline and said first axis, said centerline of said cassette and said axes of rotation of said supply and takeup spools being disposed in a common plane;

first means for defining an opening in said second section adapted to facilitate both the exposure and projection of photographic material contained within said second section;

section means within said second section for guiding photographic material contained therein along a given path between said supply spool and said takeup spool and across said opening;

a strip of unexposed photographic material having one end thereof connected to said supply spool and substantially entirely coiled therearound and extending therefrom along said path to said takeup spool to which the other end of said strip of photographic material is attached;

third means for selectively driving said takeup spool to effect the advance of said strip of photographic material from said supply spool to said takeup spool to facilitate exposure and projection operations, said third means including a member mounted for rotation about said centerline and connected to said takeup spool adapted to be operably engaged by such drive means of such camera; and fourth means for selectively driving said supply spool to effect the return of said strip of photographic material to said supply spool adapted to be operably engaged by drive means of such projector when said cassette is mounted therein, whereby said strip of photographic material may be processed with such fluid contained within said first section of said housing during its movement from one spool to the other after said strip of photographic material has been exposed and said cassette mounted in such projector.

3. The cassette of claim 2 wherein said third means comprises a first gear axially connected to said takeup spool and said member comprises a second gear operably engaging said first gear.

4. The cassette of claim 2 wherein said second section of said housing includes a pair of opposed substantially rectangular walls spaced apart in parallel alignment a distance slightly greater than the width of said strip of photographic material to serve as guide means enabling a correct tracking of said strip of photographic material within said cassette.

5. The cassette of claim 2, wherein said centerline is disposed intermediate said axes.

6. A multipurpose motion picture cassette facilitating the exposure of a strip of photographic material when mounted in a camera system of the type configured to receive film handling cassettes, of the same general configuration and dimensions having coaxially mounted supply and takeup spools disposed therein for rotation about an axis passing through such cassette in the vicinity of the point defined by the intersection of the two diagonal lines between opposite corners of such a cassette and normal to such lines, and including drive means adapted to effect the selective rotation of such takeup spool about its such axis, and to facilitate the subsequent processing and projection of the exposed strip of photographic material when said cassette is mounted in a projector unit, comprising:

a substantially rectangular housing having a centerline passing through said cassette in the vicinity of the point defined by the intersection of the two diagonal lines between opposite corners of said housing and normal to said lines, said housing being divided into first and second substantially rectangular sections, said first section being adapted to contain a quantity of processing fluid;

a supply spool mounted in said second section for rotation about a first axis parallel to and spaced from said centerline;

a takeup spool mounted in said second section for rotation about a second axis parallel to and spaced from both said centerline and said first axis;

first means for defining an opening in said second section adapted to facilitate both the exposure and projection of photographic material contained within said second section;

second means within said second section for guiding photographic material contained therein along a given path between said supply spool and said takeup spool and across said opening;

a strip of unexposed photographic material having one end thereof connected to said supply spool and substantially entirely coiled therearound and extending therefrom along said path to said takeup spool to which the other end of said strip of photographic material is attached;

third means for selectively driving said takeup spool to effect the advance of said strip of photographic material from said supply spool to said takeup spool to facilitate exposure and projection operations, said third means including a first gear axially connected to said takeup spool and a second gear mounted for rotation about said centerline operably engaging said first gear, said second gear being further adapted to be operably engaged by such drive means of such camera, said first and second gears being mounted on said second section of said housing to be disposed exteriorly of the outside face of one side thereof; and fourth means for selectively driving said supply spool to effect the return of said strip of photographic material to said supply spool adapted to be operably engaged by drive means of such projector when said cassette is mounted therein, whereby said strip of photographic material may be processed with such fluid contained within said first section of said housing during its movement from one spool to the other after said strip of photographic material has been exposed and said cassette mounted in such projector.

7. A multipurpose motion picture cassette facilitating the exposure of a strip of photographic material when mounted in a camera system of the type configured to receive film handling cassettes, of the same general configuration and dimensions having coaxially mounted supply and takeup spools disposed therein for rotation about an axis passing through such cassette in the vicinity of the point defined by the intersection of the two diagonal lines between opposite corners of such a cassette and normal to such lines, and including drive means adapted to effect the selective rotation of such takeup spool about its such axis, and to facilitate the subsequent processing and projection of the exposed strip of photographic material when said cassette is mounted in a projector unit, comprising:

a substantially rectangular housing having a centerline passing through said cassette in the vicinity of the point defined by the intersection of the two diagonal lines between opposite corners of said housing and normal to said lines, said housing being divided into first and second substantially rectangular sections releasably mounted together whereby they may be mounted in such camera system as a single unit and subsequently separated and mounted in such projector unit as two separate units, said first section being adapted to contain a quantity of processing fluid;

a supply spool mounted in said second section for rotation about a first axis parallel to and spaced from said centerline;

a takeup spool mounted in said second section for rotation about a second axis parallel to and spaced from both said centerline and said first axis;

first means for defining an opening in said second section adapted to facilitate both the exposure and projection of photographic material contained within said second section;

second means within said second section for guiding photographic material contained therein along a given path between said supply spool and said takeup spool and across said opening, said second means including a roller mounted for rotation in either direction on its axis;

a strip of unexposed photographic material having one end thereof connected to said supply spool and substantially entirely coiled therearound and extending therefrom along said path to said takeup spool to which the other end of said strip of photographic material is attached;

third means for selectively driving said takeup spool to effect the advance of said strip of photographic material from said supply spool to said takeup spool to facilitate exposure and projection operations, said third means including a member mounted for rotation about said centerline and connected to said takeup spool adapted to be operably engaged by such drive means of such camera;

fourth means, mounted on said second section of said housing to be disposed exteriorly of the outside face of one side thereof, for selectively driving said supply spool to effect the return of said strip of photographic material to said supply spool adapted to be operably engaged by drive means of such projector when said cassette is mounted therein, whereby said strip of photographic material may be processed with such fluid contained within said first section of said housing during its movement from one spool to the other after said strip of photographic material has been exposed and said cassette mounted in such projector; and fifth means for restraining such rotational movements of said roller on its said axis only when said sections are mounted together, said fifth means comprising a pin on said first section of said housing and a recess in said roller positioned to receive said pin when said sections of said housing are mounted together.

8. The cassette of claim 7 wherein said fourth means are mounted on said second section of said housing to be disposed exteriorly of the outside face of said one side thereof.

UNITED STATES PATENT OFFICE
CERTIFICATE OF CORRECTION

Patent No. 3,584,944      Dated June 15, 1971

Inventor(s) Gerald H. Cook

It is certified that error appears in the above-identified patent and that said Letters Patent are hereby corrected as shown below:

In the Specification:

Column 1, line 69, "rewing" should be --rewind--.

Column 3, line 8, "ultrarapid" should be --ultra-rapid--.

Column 4, line 53, after "whereby" delete "then".

Column 5, line 1, after "in" insert --the--.

Column 5, lines 19 and 20, " "-Super 8" " should be --"Super-8"--.

Column 5, lines 25 and 26, " "-Super 8" " should be --"Super-8"--.

In the Claims:

Column 6, line 70, "section" should be --second--.

Column 10, line 1, after "and" delete the numeral "1".

Signed and sealed this 18th day of April 1972.

(SEAL)
Attest:

EDWARD M. FLETCHER, JR.
Attesting Officer

ROBERT GOTTSCHALK
Commissioner of Patents